US012559244B2

(12) United States Patent
Pautis et al.

(10) Patent No.: US 12,559,244 B2
(45) Date of Patent: Feb. 24, 2026

(54) AIRCRAFT PROPULSION ASSEMBLY HAVING A JET ENGINE, A PYLON AND MEANS FOR ATTACHING THE JET ENGINE TO THE PYLON

(71) Applicant: Airbus Operations SAS, Toulouse (FR)

(72) Inventors: Olivier Pautis, Toulouse (FR); Laurent Agostini, Toulouse (FR); Jérôme Colmagro, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/618,130

(22) Filed: Mar. 27, 2024

(65) Prior Publication Data

US 2024/0327008 A1     Oct. 3, 2024

(30) Foreign Application Priority Data

Mar. 30, 2023     (FR) ...................................... 2303095

(51) Int. Cl.
B64D 27/40          (2024.01)
B64D 27/18          (2006.01)

(52) U.S. Cl.
CPC ........... B64D 27/402 (2024.01); B64D 27/18 (2013.01); B64D 27/40 (2024.01); B64D 27/404 (2024.01); B64D 27/406 (2024.01)

(58) Field of Classification Search
CPC .... B64D 27/402; B64D 27/18; B64D 27/404; B64D 27/406
See application file for complete search history.

(56) References Cited

U.S. PATENT DOCUMENTS

| | | | |
|---|---|---|---|
| 6,474,597 B1 * | 11/2002 | Cazenave | .............. B64D 27/18 244/54 |
| 2014/0217233 A1 * | 8/2014 | Dezeustre | .............. B64D 27/40 244/54 |

(Continued)

FOREIGN PATENT DOCUMENTS

| | | |
|---|---|---|
| EP | 4124575 A1 | 2/2023 |
| WO | 2013050715 A1 | 4/2013 |
| WO | 2014174222 A1 | 10/2014 |

OTHER PUBLICATIONS

French Search Report for corresponding French Patent Application No. 2303095 dated Sep. 19, 2023.

*Primary Examiner* — Kimberly S Berona
*Assistant Examiner* — Steven J Shur
(74) *Attorney, Agent, or Firm* — Greer, Burns & Crain, Ltd.

(57)          ABSTRACT
The invention relates to a propulsion assembly having a jet engine with an intermediate casing with a rear face and a core casing to the rear of the intermediate casing, and an attachment pylon with a frontal wall and two lateral walls, a front engine attachment having a front fitting fastened in an articulated manner via two lateral fastening points to the rear face and in a rigid manner via an upper fastening zone to the frontal wall, and an intermediate engine attachment comprising a front link rod and a rear link rod on each side. Each of the link rods is mounted in an articulated manner between the front fitting and the lateral wall. With such an arrangement, the bulk of the engine attachments is reduced in the bypass flow.

10 Claims, 4 Drawing Sheets

(56) References Cited

U.S. PATENT DOCUMENTS

| | | | |
|---|---|---|---|
| 2016/0009403 A1* | 1/2016 | Kumar | B64D 27/20 |
| | | | 248/557 |
| 2016/0159486 A1 | 6/2016 | Poisson et al. | |
| 2021/0070459 A1* | 3/2021 | West | B64D 27/18 |
| 2023/0030853 A1 | 2/2023 | Messina et al. | |

* cited by examiner

AIRCRAFT PROPULSION ASSEMBLY HAVING A JET ENGINE, A PYLON AND MEANS FOR ATTACHING THE JET ENGINE TO THE PYLON

CROSS-REFERENCES TO RELATED APPLICATIONS

This application claims the benefit of the French patent application No. 2303095 filed on Mar. 30, 2023, the entire disclosures of which are incorporated herein by way of reference.

FIELD OF THE INVENTION

The present invention relates to the general field of attaching a jet engine beneath the wing of an aircraft. It relates, in particular, to a propulsion assembly comprising a jet engine, in particular a turbofan, a pylon and also an attachment device intended to attach the jet engine beneath the pylon. It also relates to an aircraft equipped with such a propulsion assembly.

BACKGROUND OF THE INVENTION

A propulsion assembly of the prior art is fastened beneath a wing of an aircraft that has a jet engine and an attachment pylon via which the jet engine is fastened beneath the wing. Generally, the attachment pylon has a rigid structure, which is also referred to as the primary structure, bearing first fastening elements intended to attach the jet engine.

These first fastening elements are formed of a front engine attachment, a rear engine attachment, and a device for reacting the thrust forces generated by the jet engine.

The attachment pylon also has second fastening elements allowing the attachment pylon to be fastened to the wing.

The jet engine has, at the front, a fan casing surrounding an annular fan duct and, towards the rear, a core casing of smaller size, enclosing the core of the jet engine.

In the case of what is referred to as a "core" engine pylon architecture, the front engine attachment is interposed between a front end of the rigid structure and a front upper part of what is referred to as the "core casing", and the rear engine attachment is interposed between the rigid structure and a rear upper part of the same core casing. The device for reacting the thrust forces generated by the jet engine comprises two link rods disposed on either side of a median vertical plane of the jet engine and articulated, on the one hand, on the core casing, and, on the other hand, on a single spreader fastened to the rigid structure. The device for reacting the thrust forces that is formed by the two link rods and the spreader is designed to react all or most of the forces oriented in the longitudinal direction X of the jet engine.

The front engine attachment has a link rod on either side of the pylon and each link rod is fastened in an articulated manner to the pylon by one of its ends and is fastened in an articulated manner to the core casing by the other of its ends. One of the link rods is fastened via two connection points to the pylon and via one connection point to the core casing, and the second link rod is fastened via one connection point to the pylon and via one connection point to the core casing.

The front engine attachment makes it possible to react, in its plane, some of the forces oriented in the directions Y and Z and a torsion moment Mx. The rear engine attachment has a triangular shackle which is fastened in an articulated manner to the pylon by one of its upper ends and is fastened in an articulated manner to the engine by one of its lower ends. This triangular shackle is therefore made up of an upper connecting point on the side of the pylon that is positioned on the median plane of the pylon beneath its lower wall, and of two lower points on the side of the engine that are positioned on either side of the median plane of the pylon on the engine housing. Such an arrangement also makes it possible to react, in its plane, some of the forces oriented in the directions Y and Z.

Although a structure of this kind is satisfactory, it is desirable to find an alternative arrangement which makes it possible to reduce the bulk of the engine attachments, notably when the latter become the limiting elements for the definition of cowlings defining both the internal and external aerodynamic shapes of the jet engine.

SUMMARY OF THE INVENTION

An object of the present invention is to propose a propulsion assembly comprising a jet engine, a pylon and an attachment device intended to attach the jet engine beneath the pylon with reduced bulk.

To that end, there is proposed a propulsion assembly for an aircraft, the propulsion assembly having:
- a jet engine having a casing having, from the front to the rear, an intermediate casing and a core casing about a longitudinal axis and having a vertical median plane passing through the longitudinal axis, wherein the core casing extends to the rear of the intermediate casing and has a smaller diameter so as to free up a rear face of the intermediate casing,
- an attachment pylon having a rigid structure with a frontal wall and two lateral walls on either side of the median plane,
- a front engine attachment having a front fitting positioned around and above the core casing and to the rear of the intermediate casing, wherein the front fitting is fastened in an articulated manner via two lateral fastening points to the rear face and in a rigid manner via an upper fastening zone to the frontal wall, wherein the upper fastening zone is disposed in an upper part on the median plane, and wherein the lateral fastening points are disposed on either side of the median plane, and
- an intermediate engine attachment comprising two pairs of link rods, wherein each pair is disposed on a side of the median plane and has a front link rod and a rear link rod, wherein each of the link rods is mounted in an articulated manner between the front fitting and that lateral wall of the rigid structure which is on the same side.

With such an arrangement, the bulk of the engine attachments is reduced in the bypass flow.

Advantageously, each lateral fastening point provides a pivot connection, the axis of which intersects the longitudinal axis and is perpendicular to a tangent to the casing at the point of intersection between the axis and the casing.

Advantageously, each articulation between a link rod and the front fitting takes the form of a pivot connection, the axis of which is roughly parallel to the axis of the pivot connection of the lateral fastening point which is on the same side.

According to a particular embodiment, the propulsion assembly has a frontal bar arranged in the upper part of the jet engine and in the median plane and mounted in an articulated manner between a front part of the rigid structure and a front part of the intermediate casing.

Advantageously, the propulsion assembly has a shear pin with a first end secured to the front fitting and projecting a second end towards the front, and the axis of the pin is parallel to the longitudinal axis, wherein the axis of the shear pin is in the median plane, and a cutout formed in the intermediate casing and in the form of a hole, the axis of which is parallel to the longitudinal axis and which is arranged so as to receive the second end of the shear pin.

Advantageously, the hole is oblong with a vertical major axis and a horizontal minor axis.

According to a particular embodiment, the propulsion assembly has a rear engine attachment having two shackles with two fastening points that are disposed symmetrically on either side of the median plane, wherein each shackle is mounted in an articulated manner between a shoe of the rigid structure and a tab of the casing.

According to a particular embodiment, the propulsion assembly has a shear pin with a first end secured to the front fitting and projecting a second end towards the front, and the axis of the pin is parallel to the longitudinal axis, wherein the axis of the shear pin is in the median plane, and a cutout formed in the intermediate casing and in the form of a hole, the axis of which is parallel to the longitudinal axis and which is arranged so as to receive the second end of the shear pin, and the propulsion assembly has a rear engine attachment with a shackle with two fastening points that is disposed on the median plane, wherein the shackle is mounted in an articulated manner between a shoe of the rigid structure and a tab of the casing.

Advantageously, the hole is oblong with a vertical major axis and a horizontal minor axis.

The invention also proposes an aircraft having a wing and a propulsion assembly according to one of the preceding variants, the rigid structure of which is fastened beneath the wing.

BRIEF DESCRIPTION OF THE DRAWINGS

The features of the invention mentioned above, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
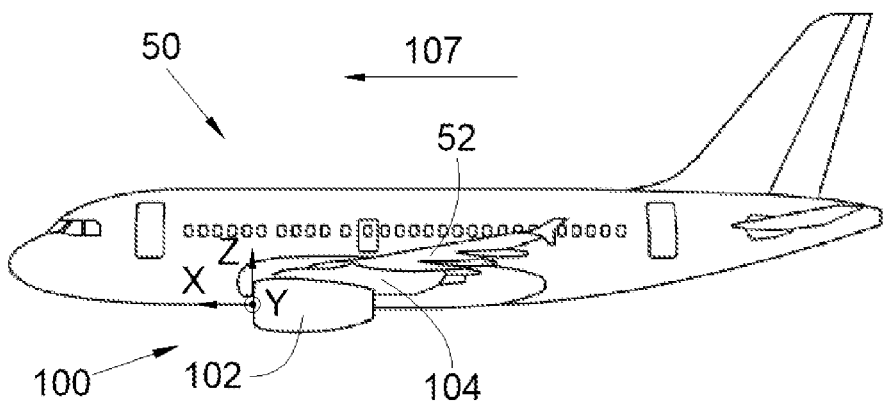
FIG. 1 shows a side view of an aircraft according to the invention.

FIG. 1 shows an aircraft 50 that has a wing 52 beneath which a propulsion assembly 100 according to the invention is mounted that has a jet engine 102, in this case housed in a nacelle, and an attachment pylon 104.

By convention, X denotes the longitudinal axis of the jet engine 102, this axis X being parallel to a longitudinal direction of this jet engine 102. Moreover, Y denotes the transverse axis of the jet engine 102, this axis being horizontal when the aircraft is on the ground, and Z denotes the vertical axis or vertical height when the aircraft is on the ground, these three axes X, Y and Z being mutually orthogonal.

Moreover, the terms "front" and "rear" are to be considered relative to a direction of forward movement of the aircraft 50 when the jet engine 102 is in operation, this direction being schematically shown by the arrow 107.

The attachment pylon 104 is roughly symmetrical with respect to a vertical median plane XZ of the jet engine 102, the plane passing through the longitudinal axis X of the jet engine 102 and being referred to hereinafter as median plane P.

Figure 2:
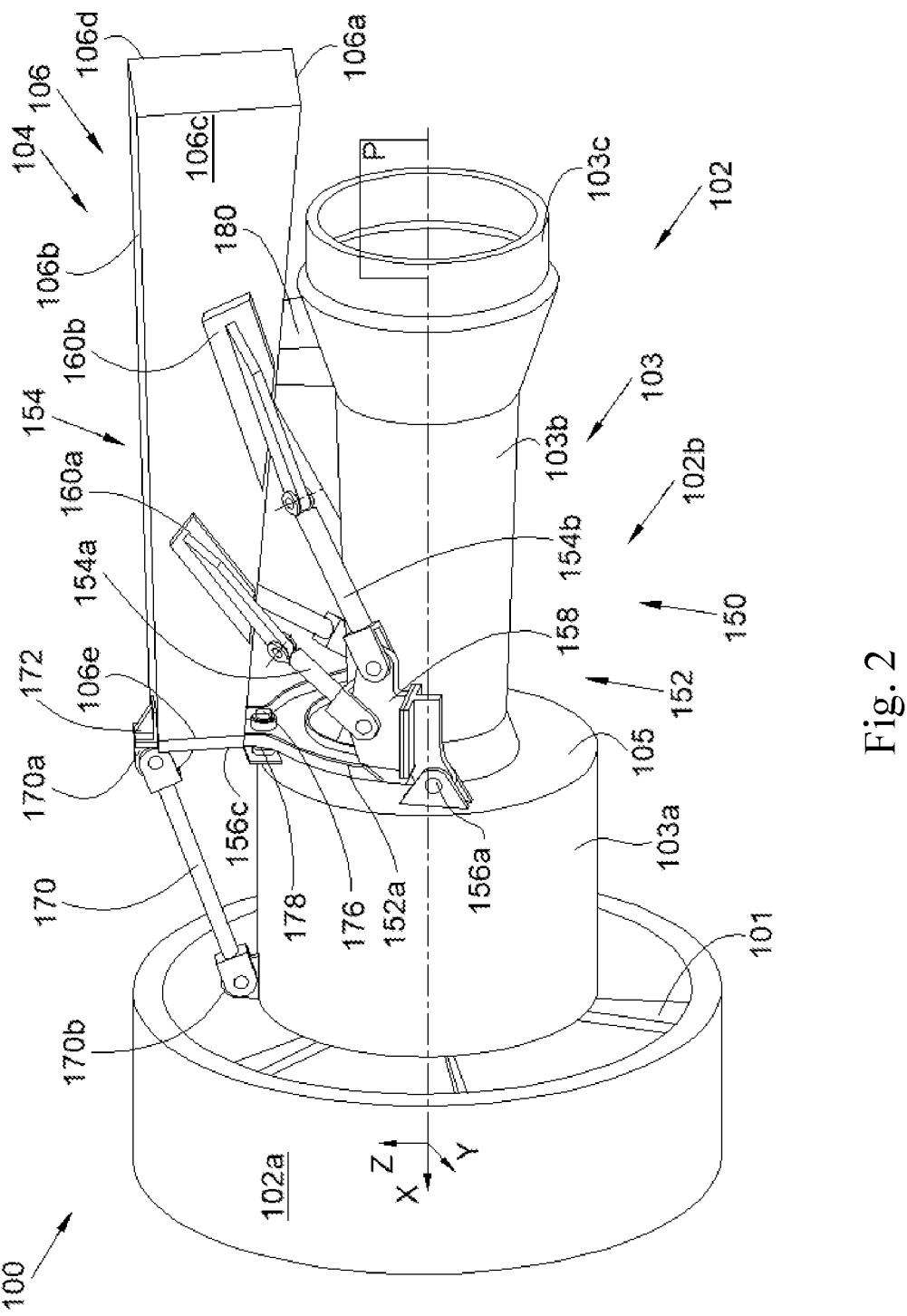
FIG. 2 is a perspective view of a propulsion assembly according to one embodiment of the invention.

FIG. 2 shows the propulsion assembly 100 that has the jet engine 102 and the attachment pylon 104 via which the jet engine 102 is fastened to the wing 52 (not shown in FIG. 2). The attachment pylon 104 is shown here by its rigid structure 106, which is also referred to as the primary structure, bearing fastening elements 150 configured to attach the jet engine 102 beneath the rigid structure 106. The rigid structure 106 extends along the longitudinal axis X between a front end and a rear end, between which there is a median zone.

In the embodiment of the invention presented in FIG. 2, the rigid structure 106 takes the form of a box that has a lower wall 106a, an upper wall 106b, two lateral walls 106c-d on either side of the median plane P and a frontal wall 106e oriented towards the front. The rigid structure 106 is fastened to the wing 52 by a fastening system that is not shown because it lies outside the scope of the invention and may take any forms known to those skilled in the art.

In the embodiment of the invention presented in FIG. 2, the jet engine 102 has, from the front to the rear, a fan casing 102a in which a fan embodying a rotor is mounted, and a stator 102b that has a casing 103 in which compression stages, a combustion chamber, turbine stages and an exhaust nozzle are successively housed. The flow of air which enters through the fan casing 102a is divided into a primary flow which flows into the stator 102b and a bypass flow which flows around the stator 102b.

In the embodiment of the invention presented in FIG. 2, the casing 103 is made up, from the front to the rear, of an intermediate casing 103a, of a core casing 103b and of a rear casing 103c which are secured to one another. The compression stages and the combustion chamber are housed in the core casing 103b, whereas the rear casing 103c accommodates the turbine stages.

The intermediate casing 103a is disposed between the fan casing 102a and the core casing 103b, and it is secured to the fan casing 102a by any suitable fastening means such as radial arms 101.

The core casing 103b extends to the rear of the intermediate casing 103a and has a smaller diameter, thus allowing a rear face 105 of the intermediate casing 103a to be freed up, the face in this case extending in an overall vertical plane YZ, that is to say, perpendicular to the longitudinal axis X.

Figure 3:
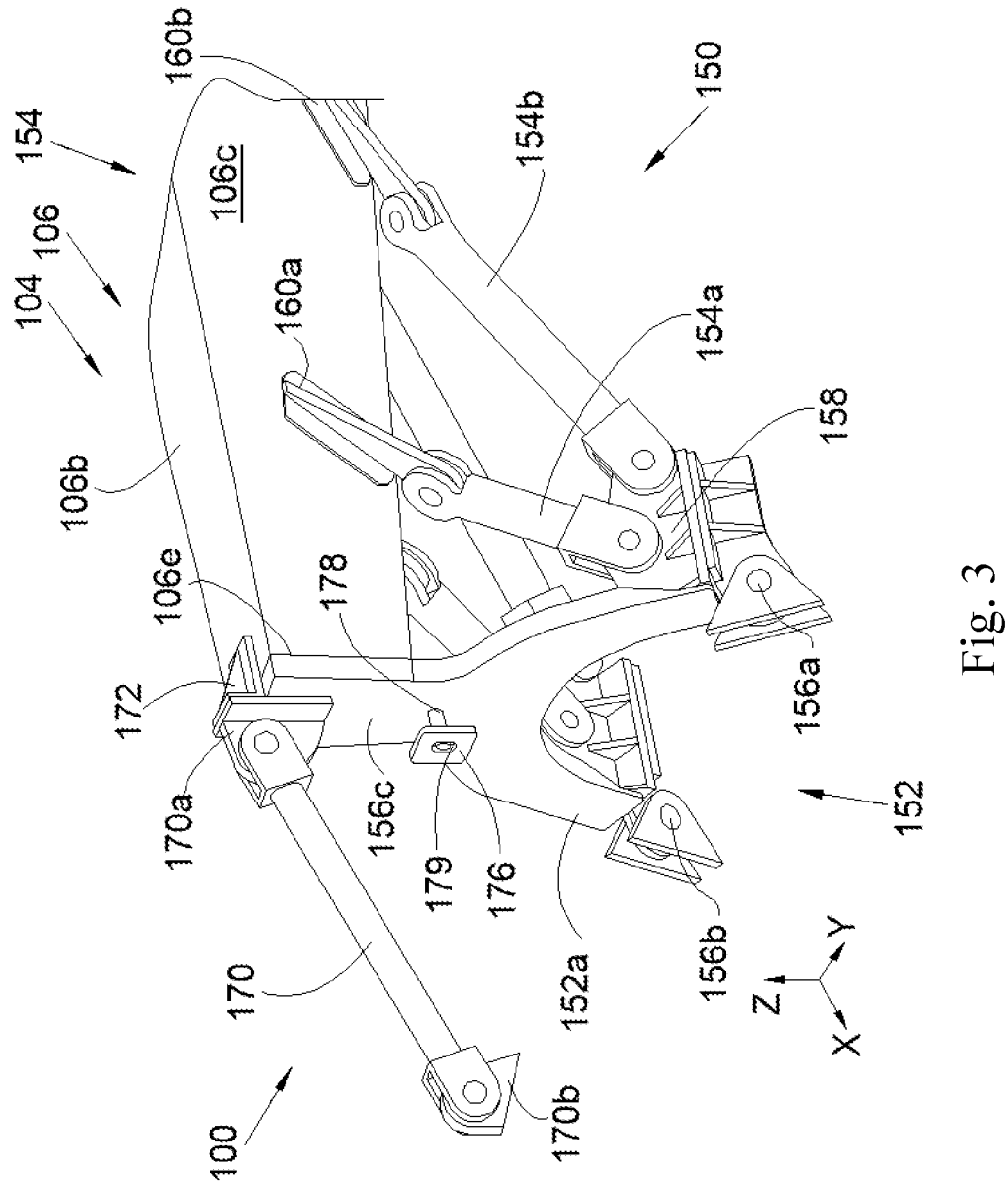
FIG. 3 is a perspective view of the propulsion assembly in FIG. 2 without the jet engine according to the embodiment of the invention.

The fastening elements 150 comprise a front engine attachment 152 and an intermediate engine attachment 154. FIG. 3 shows the fastening elements 150 without the jet engine 102.

The front engine attachment 152 has a front fitting 152a which takes the form of a horseshoe that is positioned around and above the core casing 103b, in particular above the upper half-segment of the front zone of the core casing 103b, and to the rear of the intermediate casing 103a. The front fitting 152a is fastened in an articulated manner via two lateral fastening points 156a-b to the intermediate casing 103a, and, more particularly, to its rear face 105, and in a rigid manner via an upper fastening zone 156*c* to the rigid structure 106, and, more particularly, to the frontal wall 106*e*. Part of the front fitting 152*a* is thus pressed and fastened against the frontal wall 106*e*.

The upper fastening zone 156*c* is disposed in the upper part on the median plane P and the lateral fastening points 156*a-b* are disposed on either side of the median plane P.

The upper fastening zone 156*c* provides a complete connection or embedding between the front fitting 152*a* and the rigid structure 106. The fastening is realized, for example, with the aid of threaded fasteners, rivets, or the like around the entire periphery of the frontal wall 106*e* in association with the lower wall 106*a*, upper wall 106*b* and lateral walls 106*c-d* of the rigid structure 106.

Each lateral fastening point 156*a-b* provides a pivot connection about a direction of articulation between the front fitting 152*a* and the rear face 105 of the intermediate casing 103*a*. Each pivot connection is realized, in this case, by a female clevis secured to the rear face 105 of the intermediate casing 103*a* and a male clevis secured to the front fitting 152*a* and fitted into the female clevis, and by a pin which passes through the female clevis and fits into the male clevis. In the embodiment of the invention presented here, each lateral fastening point 156*a-b* is, in this case, roughly at the same height as the longitudinal axis X, and, viewed from the rear, the axis of each pivot connection is oriented at about 45° with respect to the transverse axis Y, in the clockwise direction for the lateral fastening point 156*a* on the port side and in the anticlockwise direction for the lateral fastening point 156*b* on the starboard side. In general, the direction of the axis varies from 10° to 90° with respect to the vertical axis Z as a function of the azimuthal position of the lateral fastening points 156*a-b*, and preferably the axis intersects the longitudinal axis X and is perpendicular to the tangent to the casing 103 at the point of intersection between the axis and the casing 103; in other words, the axis is perpendicular to the plane defined by the lateral fastening point 156*a-b* and the link rods 154*a-b* that are on the same side.

The intermediate engine attachment 154, which constitutes a device for reacting the thrust forces of the jet engine 102, comprises two pairs of link rods 154*a-b*, wherein each pair is disposed on a side of the median plane P and articulated, on the one hand, at the front to the front fitting 152*a*, and, on the other hand, at the rear to the rigid structure 106 in the median zone, and, more particularly, to the lateral wall 106*c-d* that is on the same side.

Each pair of link rods 154*a-b* has a front link rod 154*a* and a rear link rod 154*b* and each are mounted in an articulated manner at the front to the front fitting 152*a* and at the rear to the lateral wall 106*c-d*.

In the embodiment of the invention presented here, the front fitting 152*a* has, for each pair of link rods 154*a-b*, an extension 158 which extends towards the rear from each lateral fastening point 156*a-b* and on which each link rod 154*a-b* is mounted in an articulated manner about a pivot connection.

Similarly, the intermediate engine attachment 154 has, for each link rod 154*a-b*, a fitting 160*a-b* which is rigidly fastened to the lateral wall 106*c-d* in question, and on which the link rod 154*a-b* is mounted in an articulated manner about a pivot connection.

In the embodiment of the invention presented here, each end of a link rod 154*a-b* has a female clevis into which a male clevis is fitted, the clevises respectively being made up of part of the extension 158 or of part of the respective fitting 160*a-b*, and wherein a pin passes through the female clevis and fits into the male clevis. Each axis of the pivot connection corresponding to an extension 158 is roughly parallel to the axis of the pivot connection of the lateral fastening point 156*a-b* that is on the same side.

With such an arrangement, the bulk of the front engine attachment is reduced in the bypass flow and induces less aerodynamic protrusion at the cowling of the secondary duct.

Each lateral fastening point 156*a-b* makes it possible to react forces in two directions, primarily oriented along the axes Z and X.

According to the embodiment of the invention presented in FIG. 2, the propulsion assembly 100 has a frontal bar 170 which is mounted in an articulated manner between the rigid structure 106 and the intermediate casing 103*a*. The frontal bar 170 is arranged in the upper part of the jet engine 102 and in the median plane P. In a non-limiting manner, the frontal bar 170 may be in the form of a link rod or of a shackle.

The frontal bar 170 is more particularly mounted in an articulated manner between a front part of the rigid structure 106, in this case the front part of the upper wall 106*b*, and a front part of the intermediate casing 103*a*.

Each articulation of the frontal bar 170 to the rigid structure 106 and to the intermediate casing 103*a* in this case takes the form of a pivot connection, the axis of which is parallel to the transverse axis Y.

The frontal bar 170 reacts forces in a direction primarily oriented along the axis X and, in combination with the lateral fastening points 156*a-b*, reacts the bending moment My.

In the embodiment of the invention presented here, each pivot connection is realized in this case by a female clevis secured to one end of the frontal bar 170 and respectively a first male clevis 170*a* secured to the rigid structure 106 or a second male clevis 170*b* secured to the intermediate casing 103*a*, and wherein a pin passes through the female clevis and is fitted into the male clevis 170*a-b* parallel to the transverse axis Y.

In the embodiment of the invention presented here, the first male clevis 170*a* is rigidly fastened to the upper wall 106*b* by an L-shaped bracket 172 and to the front fitting 152*a* by any suitable means such as threaded fasteners, rivets, welding spots, etc.

In the first embodiment, the propulsion assembly 100 also has a shear pin 176 (also called a spigot) which is cylindrical, which has a first end secured to the front fitting 152*a* and which projects a second end towards the front, and the axis of the pin is parallel to the longitudinal axis X. The axis of the shear pin 176 is in the median plane P.

The propulsion assembly 100 also has a cutout 178 formed in the intermediate housing 103*a*, and, more particularly in this case, the rear face 105.

The cutout 178 takes the form of a hole 179, the axis of which is parallel to the longitudinal axis X, and which is arranged so as to receive the second end of the shear pin 176. In the embodiment of the invention presented here, the hole 179 is oblong with a vertical major axis, that is to say, parallel to the vertical axis Z, and a horizontal minor axis, that is to say, parallel to the transverse axis Y, wherein the width of the hole 179 is adapted to the diameter of the shear pin 176 so as to provide a 'tight' sliding contact with the shear pin 176. The cutout 178 and the shear pin 176 are thus free to rotate with respect to one another and free to move vertically in translation with respect one another.

The shear pin 176 reacts forces in a direction oriented along the transverse axis Y. Thus, what is referred to as a tight assembly without play is obtained along the transverse axis Y and what is referred to as a non-tight assembly with play is obtained along the vertical axis Z.

According to a first variant of the invention, the frontal bar 170 and the shear pin 176 are replaced by a rear engine attachment 180 which is mounted in an articulated manner between the rigid structure 106, and, more particularly in this case, the lower wall 106a, and the casing 103, and, more particularly in this case, the core casing 103b.

Figure 4:
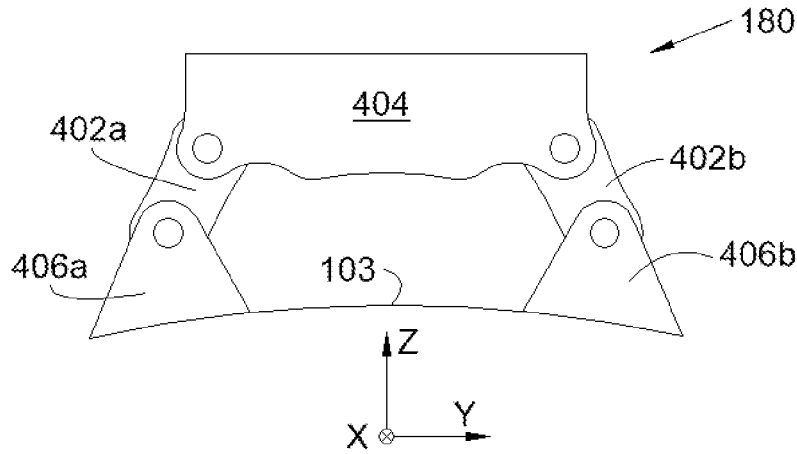
FIG. 4 is a front view of a first example of a rear engine attachment implemented in the propulsion assembly according to a first variant of the invention.

An example of a rear engine attachment 180 is shown in FIG. 4. The rear engine attachment 180 has two shackles 402a-b with two fastening points and they are disposed symmetrically on either side of the median plane P. Each shackle 402a-b is mounted in an articulated manner between a shoe 404 of the rigid structure 106, and, more particularly, of the lower wall 106a, and a tab 406a-b of the housing 103, and, more particularly, of the core housing 103b.

Each articulation takes the form of a pivot connection, the axis of which is parallel to the longitudinal axis X, and it is realized, for example, in the form of a clevis-type connection.

Such a rear engine attachment 180 reacts forces in two directions primarily oriented along the axes Z and Y and, in combination with the front engine attachment plane, reacts the bending moment My.

According to a second variant of the invention, the shear pin 176 is retained and the frontal bar 170 is replaced by a rear engine attachment 180 which is mounted in an articulated manner between the rigid structure 106, and, more particularly in this case, the lower wall 106a, and the casing 103, and, more particularly in this case, the core casing 103b. Thus, the tight assembly without play along the transverse axis Y and the non-tight assembly with play along the vertical axis Z is retained.

Figure 5:
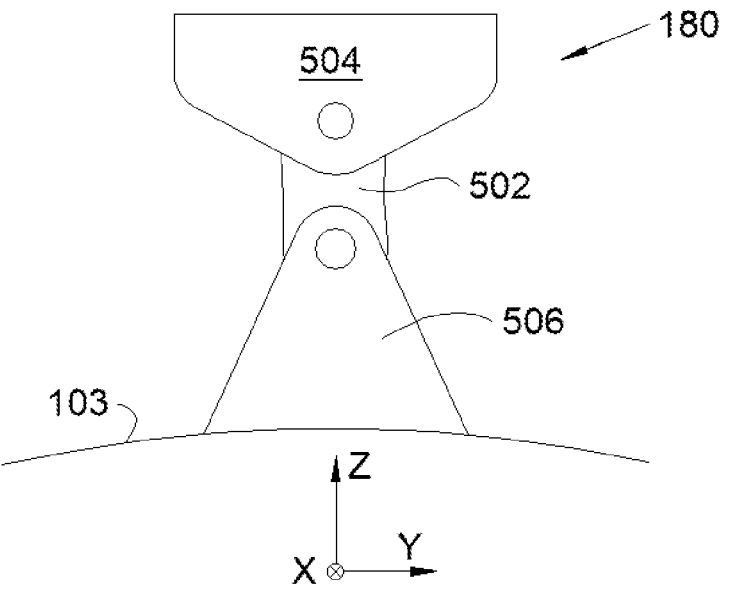
FIG. 5 is a front view of a second example of a rear engine attachment implemented in the propulsion assembly according to a second variant of the invention.

An example of a rear engine attachment 180 is shown in FIG. 5. The rear engine attachment 180 has a shackle 502 with two fastening points that is disposed on the median plane P. The shackle 502 is mounted in an articulated manner between a shoe 504 of the rigid structure 106, and, more particularly, of the lower wall 106a, and a tab 506 of the housing 103, and, more particularly, of the core housing 103b.

Each articulation takes the form of a pivot connection, the axis of which is parallel to the longitudinal axis X, and it is realized, for example, in the form of a clevis-type connection.

Such a rear engine attachment 180 reacts forces in a direction oriented along the vertical axis Z and, in combination with the front engine attachment plane, reacts the bending moment My.

It should be noted that in all the proposed embodiments of the invention the interface system between the engine and the engine pylon is referred to as "isostatic", that is to say, all six degrees of freedom (3 in translation/3 in rotation) are blocked and make it possible to transfer forces and moments in an "efficient and robust manner".

In this case, the positioning of the two lateral fastening points 156a-b and the span of the fitting 152a are proposed on an angular sector of between 10 o'clock and 2 o'clock. However, these elements may be proposed on an angular sector of between 9 o'clock and 3 o'clock without changing the scope of the invention.

Lastly, the positioning of the two lateral fastening points 156a-b may be disposed radially over the entire rear face 105, that is to say, between the inner diameter and the outer diameter.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, said propulsion assembly comprising:
   a jet engine having a casing having, from the front to the rear, an intermediate casing and a core casing about a longitudinal axis and having a vertical median plane passing through the longitudinal axis, wherein the core casing extends to the rear of the intermediate casing and has a smaller diameter so as to free up a rear face of the intermediate casing,
   an attachment pylon having a rigid structure with a frontal wall and two lateral walls on either side of the median plane,
   a front engine attachment having a front fitting positioned around and above the core casing and to the rear of the intermediate casing such that a front face of the front fitting is parallel to, and spaced apart from, the rear face of the intermediate casing, wherein:
      the front fitting is fastened in an articulated manner via two lateral fastening points to the rear face and in a rigid manner via an upper fastening zone to the frontal wall,
      the upper fastening zone is disposed in an upper part on the median plane,
      the lateral fastening points are disposed on either side of the median plane, and
      the front engine attachment has two extensions, such that one of the two extensions extend from each of the two lateral fastening points towards the rear of the jet engine, and
   an intermediate engine attachment comprising two pairs of link rods, wherein each pair of the link rods is disposed on a side of the median plane and has a front link rod and a rear link rod, wherein each of said link rods is mounted in an articulated manner to one of the two extensions of the front engine attachment such that the front link rod is mounted on the corresponding extension at a location closer to the jet engine than a location where the rear link rod is mounted on the corresponding extension and each of said link rods is mounted to a fitting which is rigidly fastened to one of the two lateral walls of the rigid structure of the attachment pylon which is on a same side of the median plane.

2. The propulsion assembly according to claim 1, wherein each lateral fastening point provides a pivot connection, an axis of which intersects the longitudinal axis and is perpendicular to a tangent to the casing at a point of intersection between the axis and the casing.

3. The propulsion assembly according to claim 2, wherein each articulation between a link rod and the front fitting is formed as a pivot connection, an axis of which is parallel to an axis of the pivot connection of the lateral fastening point which is on the same side.

4. The propulsion assembly according to claim 1, further having a frontal bar arranged in an upper part of the jet engine and in a median plane and mounted in an articulated manner between a front part of the rigid structure and a front part of the intermediate casing.

5. The propulsion assembly according to claim 4, further having a shear pin with a first end secured to the front fitting and projecting a second end towards the front, and an axis of said pin is parallel to the longitudinal axis of the jet engine, wherein the axis of the shear pin is in the median plane, and a cutout formed in the intermediate casing as a hole, an axis of the hole is parallel to the longitudinal axis and which is arranged to receive the second end of the shear pin.

6. The propulsion assembly according to claim 5, wherein the hole is oblong with a vertical major axis and a horizontal minor axis.

7. The propulsion assembly according to claim 1, further having a rear engine attachment having two shackles with two fastening points that are disposed symmetrically on either side of the median plane, wherein each shackle is mounted in an articulated manner between a shoe of the rigid structure and a tab of the casing.

8. The propulsion assembly according to claim 1, further having a shear pin with a first end secured to the front fitting and projecting a second end towards the front, and an axis of said shear pin is parallel to the longitudinal axis, wherein the axis of the shear pin is in the median plane, and a cutout formed in the intermediate casing as a hole, the axis of the hole is parallel to the longitudinal axis and the hole is arranged so as to receive the second end of the shear pin, and wherein the propulsion assembly has a rear engine attachment with a shackle with two fastening points that is disposed on the median plane, wherein the shackle is mounted in an articulated manner between a shoe of the rigid structure and a tab of the casing.

9. The propulsion assembly according to claim 8, wherein the hole is oblong with a vertical major axis and a horizontal minor axis.

10. An aircraft having a wing and a propulsion assembly according to claim 1, the rigid structure of the propulsion assembly being fastened beneath the wing.

* * * * *